United States Patent [19]

Spanur

[11] 4,146,681
[45] Mar. 27, 1979

[54] SEAL CLOSURE FOR A GALVANIC CELL

[75] Inventor: Frank G. Spanur, Parma Heights, Ohio

[73] Assignee: Union Carbide Corporation, New York, N.Y.

[21] Appl. No.: 864,083

[22] Filed: Dec. 23, 1977

[51] Int. Cl.² .................... H01M 2/12; H01M 2/04
[52] U.S. Cl. ....................................... 429/54; 429/172
[58] Field of Search ............................ 429/54, 172

[56] References Cited
U.S. PATENT DOCUMENTS

| 3,740,271 | 6/1973 | Jammet et al. | 429/172 |
| 3,802,923 | 4/1974 | Spanur | 429/54 |

Primary Examiner—Donald L. Walton
Attorney, Agent, or Firm—Eugene Lieberstein

[57] ABSTRACT

An improved seal closure for the open end of a cell comprising a cover including an annular depending flange which has a circumferential notch for engaging the inwardly turned peripheral edge of the cell, an annular recess located in the cover and extending below the level of the notch and a locking collar for insertion within the recess.

10 Claims, 3 Drawing Figures

SEAL CLOSURE FOR A GALVANIC CELL

This invention relates to a cylindrical galvanic cell and more particularly to a seal closure assembly for securing the open end of the cell and controllably venting excess gas pressure.

Resealable vent closures for cylindrical dry cells are well known in the art. In U.S. Pat. No. 3,802,923 the open end of the cell is closed by a cover which operates as a valve in conjunction with the open end of the cell for releasing trapped gas when the pressure within the cell exceeds a predetermined limit. The cover also serves to secure the cell from internal and external displacement forces. The latter is accomplished by providing the cover with a depending flange having an annular notch which is adapted to engage the peripheral edge of the open container and lock it in place. For small diameter cells such as, for example, the "AAA" size dry cell the locking forces provided by this closure arrangement may be insufficient to protect against release of the closure particularly after long periods of storage during which the zinc and/or plastic may creep.

Additional closure protection may also be necessary for other round cell sizes in applications where abusive external forces may exist to cause separation of the cell container from the cover member. For example, internally developed forces may form in a dry cell from the trapped gas below the cathode mix at the bottom end of the cell which may tend to cause the entire cathode mix structure to rise up against the seal closure and unlock the cover from inside the container. In addition, the external jacket of the dry cell which is usually of a paper composition is not designed to provide protection against externally applied forces or to support the container from internally developed forces.

Accordingly, it is the principal object of the present invention to provide a seal closure assembly for a cylindrical galvanic cell which can vent internally developed gas while securing the open end of the container in a locked relationship to the closure assembly under relatively large internal and/or external displacing forces.

Other objects and advantages of the present invention will become apparent from the following detailed description of the invention when read in connection with the accompanying drawing of which:

Figure 1:
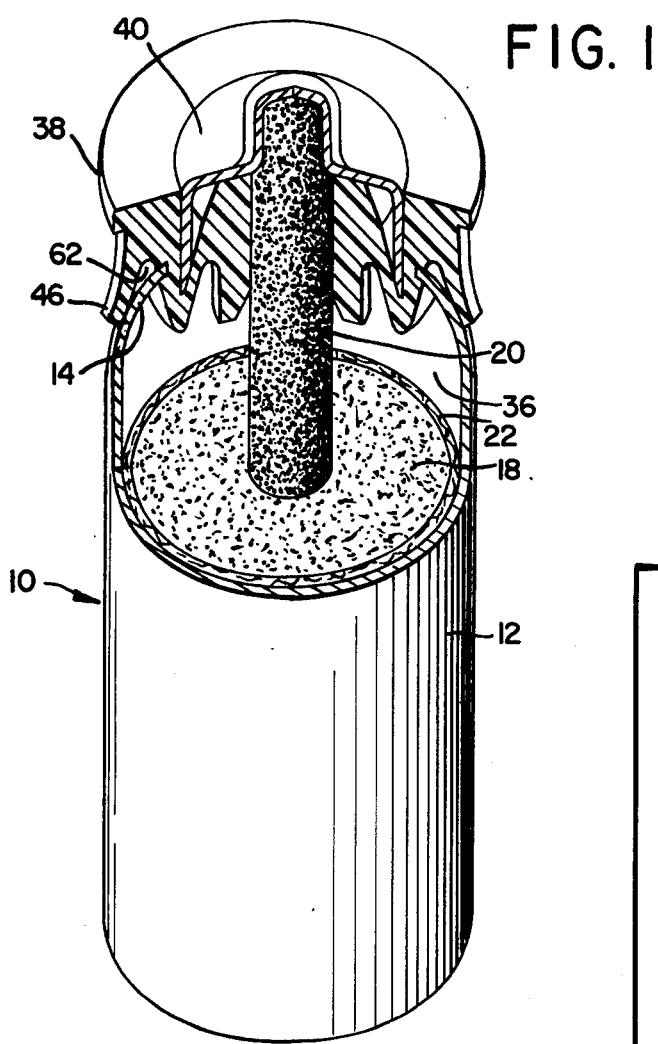
FIG. 1 is a perspective view, partly in cross-section, of an assembled primary galvanic dry cell incorporating the preferred seal closure embodiment of the present invention.
Figure 2:
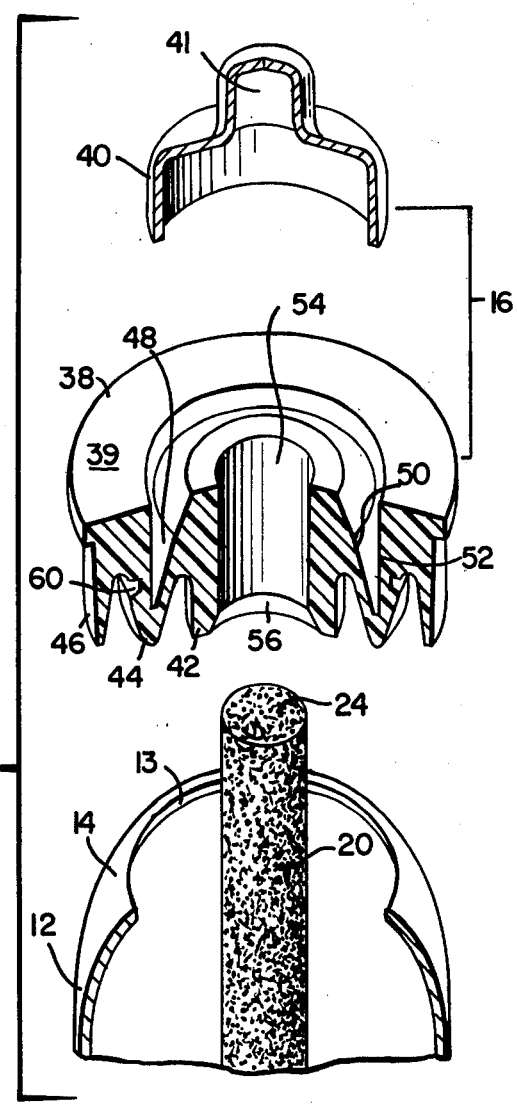
FIG. 2 is an exploded perspective view partly in cross-section of the preferred seal closure assembly of FIG. 1.

Referring now in particular to FIGS. 1 and 2 in which is shown a primary galvanic dry cell 10 embodying the closure assembly of the present invention. The dry cell 10 includes a cylindrical container 12 having an open peripheral top edge 13 which is inwardly turned to form a curved rim 14. The top edge 13 is mechanically locked to the closure assembly 16 for sealing the cell 10 in a manner to be explained in more detail hereafter. The cell container 12 serves as the anode for the cell 10 and may be formed from an electrochemically consumable metal such as zinc. A cathode in the form of a bobbin 18 is disposed within the container 12 about a centrally disposed cathode collector rod 20. A layer of separator material 22 which contains electrolyte, e.g., a thin bibulous paper coated with an electrolyte gel paste surrounds the cathode bobbin 18 for separating the cathode 18 from the anode container 12. The cathode bobbin 18 may represent a depolarizer mix cake containing, for instance, manganese dioxide, a conductive material such as carbon black or graphite and electrolyte. The cathode bobbin 18 may be molded about the collector rod 20 in a separate operation prior to cell assembly and placed inside the cell container 12 with the upper end 24 of the cathode collector rod 20 protruding through the open end of the cell container 12. An air space 36 is formed between the cathode bobbin 18 and the top edge 13 of the container 12 to accommodate any liquid spew that may be formed on discharge of the cell.

The closure assembly 16, as is more clearly shown in FIG. 2 comprises a cover 38 and a locking collar 40. The cover 38 should be composed of an electrically insulating and corrosion resistant material such as a resilient plastic which may be molded into one piece. Suitable resilient plastic material for this purpose includes thermoplastic organic resins such as polyethylene and polypropylene. The cover 38 includes three annular ring flanges depending from its lower side, i.e., an inner flange 42, an intermediate flange 44 and an outer flange 46. The flanges are all spaced apart and are substantially concentric with one another. On the upper side 39 of cover 38 is formed an annular recess 48 which should lie within the intermediate flange 44 to accommodate the locking collar 40 and should extend below the level of notch 60 as described later. The annular recess 48 has a preferred right angle cross-sectional geometry with an inclined wall 50 which facilitates entry of the locking collar 40 and a substantially vertical wall 52 which may have a slight taper of up to about 3.0 degrees with respect to the vertical. The locking collar 40 is a metal one piece member having a cylindrical body with a raised top portion 41 for covering and gripping the protruding end 24 of the rod 20. The locking collar 40 is inserted into the annular recess 48 after the cover 38 is assembled in place over the container 12 as will be explained in detail hereafter.

A central opening 54 of substantially cylindrical geometry extends through the inner flange 42 of the cover 38 and is of a diameter substantially equivalent to the diameter of the collector rod 20 so as to establish a tight interference fit with the collector rod 20. The collector rod 20 penetrates the opening 54 when the seal assembly 16 is pressed into place. The inner flange 42 may be chamfered at its bommom end 56 to facilitate entry of the collector rod 20.

The outer flange 46 is in the form of a thin annular lip which extends over the curved rim 14 of the container 12. The diameter of the outer flange is slightly smaller than the diameter of the cell container 12 so that when the cover 38 is pressed over the open end of the cell container 12 the outer flange 46 flares outwardly to engage the curved rim 14. The curved rim 14 may be formed by crimping the peripheral edge 13 of the open cell container 12 using a conventional crimping tool which has the desired radius of crimp (e.g., approximately ¼ inch radius in the case of a standard "D" size zinc can). The crimping tool is forced over the open cell container 12 to turn the peripheral edge 13 inwardly until a curved rim 14 is formed having an appropriate radius of curvature. The flange 46 engages the curved rim 14 in interference fit to form an effective fluid-tight seal at the open end of the cell container 12. This fluid-tight seal remains closed during normal shelf storage and operation of the dry cell. Hence, the cell is effectively sealed against the escape of electrolyte or moisture by evaporation and is also sealed against the ingress of air or oxygen from the atmosphere. However, when the cell is subjected to severe or abusive conditions of discharge or high temperature shelf the gas pressure inside the cell 10 may reach an undesirable or excessive level. Upon the development of excessive gas pressure of above a predetermined level the outer flange 46 is caused to deflect outwardly in a direction away from the curved rim 14 thereby breaking the seal and allowing gas to escape or vent from inside the cell 10. Once the gas pressure is released, the resiliency of the outer flange 46 causes it to reseat and to reestablish the seal. Accordingly, the outer flange 46 acts as a resilient flapper valve member which functions in conjunction with the curved rim 14 of the container 12 for resealably releasing an excess of gas pressure from inside the cell 10.

The intermediate flange 44 of the cover 38 is formed with an annular notch 60 surrounding its circumference. The inwardly turned edge 13 snaps into engagement with the annular notch 60 upon depressing the cover 38 into the container 12. Although this connection provides a relatively secure mechanical lock, the holding power of this lock is greatly enhanced by the insertion of the locking collar 40 into the annular recess 48. To realize maximum benefit from the locking collar 40 it is important that the collar 40 extend down within the recess 48 to a level at least equal and preferably below the level of the notch 60 so as to prevent the intermediate flange 44 from unsnapping.

The seal closure is assembled by placing the cover 38 on top of the cell container 12 with the inner flange 42 surrounding the cathode collector rod 20. The cover is then pressed downwardly so as to force the intermediate flange 44 through the open container 12 until the peripheral edge 13 snaps into engagement with the notch 60. The locking collar 40 is then pushed down into the annular recess 48 until its lower edge lies below the level of notch 60 and top 41 is seated in gripping engagement with electrode rod 20.

It should be understood that the seal closure assembly 16 of the present invention does not preclude the passage of gas from within the cell 10 through the connection at notch 60. Internally developed gas follows a path from the air space 36 through the mechanical juncture formed between the edge 13 of the container 12 and the notch 60 and then into the annular space 62 between the curved rim 14 and the outer flange 46 which is sealed off during normal use of the cell. The gas pressure inside the annular space 62 is substantially the same as the gas pressure inside the cell container 10 and is not released by the outer flange 46 until the pressure reaches a predetermined level.

The advantages of the closure arrangement of the present invention is evidenced from the following Table I which compares holding power for a mocked-up "N" cell configuration using the seal closure of FIGS. 1 and 2 both with and without the locking collar 40:

TABLE I

| "N" SIZE CELL MOCK-UP | | | |
|---|---|---|---|
| Without Locking Collar on .315" I.D. Crimp | | With Locking Collar on .315" I.D. Crimp | |
| Mechanical Pull-off Force | Gas pressure Release Force | Mechanical Pull-off Force | Gas Pressure Release Force |
| 1½ lb. | 33 psi | on 30# Limit Force Gage 30 lb. | 200 psi |
| 2 lb. | 22 psi | 30 lb. | |
| 4¼ lb. | 32 psi | on 50# Limit Force Gage 42½ lb. | |
| | 33 psi | | |

The following Table II shows the venting characteristics for a typical "N" cell using the seal closure assembly of the present invention.

TABLE II

| "N" SIZE CELL - VENTING CHARACTERISTICS AT ROOM TEMPERATURE | | | | |
|---|---|---|---|---|
| Sample No. | Zinc Can Crimp I.D. | Initial Venting Pressure | Six Days Venting Pressure | Twelve Days Venting Pressure |
| 1 | .318" | 60 psi* | 75 psi | 80 psi |
| 2 | .321" | 55 psi | 30 psi | 30 psi |
| 3 | .321" | 60 psi* | 38 psi | 37 psi |
| 4 | .323" | 60 psi* | 56 psi | Perforated Can - No Test |

*60 psi Limit on Gage

Figure 3:
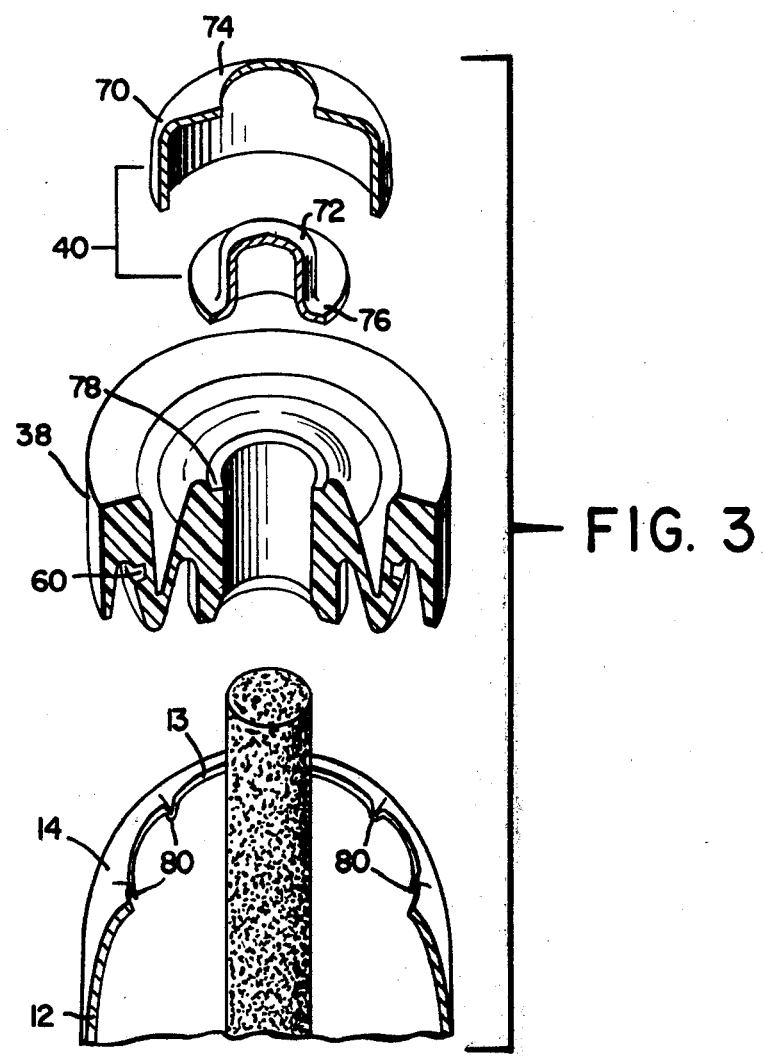
FIG. 3 is an exploded perspective view of another embodiment of the seal closure assembly of the present invention.

FIG. 3 shows an alternative embodiment of the present invention wherein the locking collar 40 is divided into independently functioning component members 70 and 72 respectively. The locking member 70 has a cylindrical body portion which is pressed into the annular recess 48 to increase the holding power of the mechanical connection between the edge 13 and the notch 60 as explained heretofore. For this purpose member 70 may be composed of either plastic or metal. The contact member 72, on the other hand, functions as the positive terminal cap for the cell and must be of metal. The member 72 is positioned over and in contact with the collector rod 20 and has a rim 76 which is seated upon a circular ledge 78 formed in the cover 38. The member 70 has a partially closed top surface 74 which is fitted over member 72. If desired rim 76 of member 72 can be embedded in cover 38 by molding or mechanically pressing to form a unitary structure.

The container 12 is crimped at its open end as explained heretofore to form the curved rim 14. An additional indenting operation may be carried out to form a number of inwardly directed projections 80 around the peripheral edge 13 of the container 12. The projections 80 will bite into the bottom of notch 60 upon depressing the cover 38 into the container 12 to provide an additional locking force for holding the edge 13 in place within the notch 60. It should be understood that this feature may be used in combination with the one piece locking collar 40 of FIGS. 1 and 2 or alternatively the two-piece locking collar of FIG. 3 may be used with the crimped container 12 without forming the projections 80.

The raw cell 10 of either embodiment, after the seal closure assembly 16 has been secured to the container 12, may be finished in a conventional manner by encasing it within an outer paper jacket (not shown). The paper jacket need only extend up to the outer flange 46 of the cover 38.

What is claimed is:

1. A galvanic cell comprising a cylindrical container having an open end with an inwardly turned peripheral edge, said container including therein active ingredients of the cell and a seal closure assembly for said open end, said seal closure assembly comprising:
- a cover having an upper side and lower side and a first resilient annular flange depending from the lower side thereof;
- a notch circumferentially disposed about said flange with said peripheral edge being seated within said notch;
- an annular recess in the upper side of said cover and extending to a level below the level of said notch; and
- a collar extending within said recess.

2. A galvanic cell as defined in claim 1 wherein said collar extends within the recess to below the level of said notch.

3. A galvanic cell as defined in claim 2 further comprising a second resilient annular flange surrounding said first annular flange and extending over said inwardly turned peripheral edge for forming a reseablable vent in combination therewith.

4. A galvanic cell as defined in claim 3 wherein said annular recess has a substantially right angle cross-sectional geometry with an inclined wall and a substantially vertical wall.

5. A galvanic cell as defined in claim 4 wherein said wall substantially aligned with the vertical has a predetermined taper of up to about 3.0 degrees.

6. A galvanic cell as defined in claim 5 wherein said cover is plastic and wherein said collar is metal.

7. A galvanic cell as defined in claim 6 wherein said collar is of unitary construction having a cylindrical lower body and a raised centrally disposed upper portion.

8. A galvanic cell as defined in claim 7 wherein said inwardly tapered peripheral edge has a predetermined number of indented projections extending therefrom for gripping said notch.

9. A galvanic cell as defined in claim 4 wherein said collar comprises a first member of cylindrical geometry extending within said annular recess and a second member representing the positive terminal cap for said cell.

10. A galvanic cell as defined in claim 9 wherein said inwardly turned peripheral edge has a predetermined member of indented projections extending therefrom for gripping said notch.

* * * * *